United States Patent [19]

Tanigaki et al.

[11] Patent Number: 4,730,231

[45] Date of Patent: Mar. 8, 1988

[54] GAS INSULATED METAL-CLAD HIGH VOLTAGE EQUIPMENT WITH INSULATING BUSHING

[75] Inventors: Shuzo Tanigaki, Tokyo; Masashi Tokushige, Kunitachi, both of Japan

[73] Assignee: Kabushiki Kaisha Meidensha, Tokyo, Japan

[21] Appl. No.: 832,376

[22] Filed: Feb. 24, 1986

[30] Foreign Application Priority Data

| Mar. 4, 1985 [JP] | Japan | 60-30707[U] |
| Mar. 4, 1985 [JP] | Japan | 60-30708[U] |
| Dec. 19, 1985 [JP] | Japan | 60-286199 |

[51] Int. Cl.⁴ .................................. H02B 11/14
[52] U.S. Cl. ............................ 361/336; 174/18; 174/151; 200/50 AA; 361/338; 361/341
[58] Field of Search ............ 174/18, 151; 200/50 AA; 361/336, 338, 341, 355, 361

[56] References Cited

U.S. PATENT DOCUMENTS

| 3,030,463 | 4/1962 | Kozlovic et al. | 200/50 AA |
| 3,130,353 | 4/1964 | Mount | 361/341 |
| 3,188,415 | 6/1965 | Netzel | 200/50 AA |
| 3,461,348 | 8/1969 | Eichelberger | 361/341 |
| 4,476,361 | 7/1984 | Masaki et al. | 200/305 |

FOREIGN PATENT DOCUMENTS

| 0688761 | 6/1964 | Canada | 200/50 AA |
| 2035064 | 1/1972 | Fed. Rep. of Germany | 174/151 |
| 2321845 | 11/1973 | Fed. Rep. of Germany | 361/338 |

*Primary Examiner*—Philip H. Leung
*Assistant Examiner*—Gregory D. Thompson
*Attorney, Agent, or Firm*—Bachman & LaPointe

[57] ABSTRACT

A gas insulated metal-clad electrical power equipment has a cylindrical insulating bushing for supporting an electrical conductor. The bushing is filled with the insulating gas therein and air-tightly fixed to a grounded metal compartment wall member of the equipment in such a way that the outer surface of the conductor directly faces the inner circumferential surface of a through hole formed in the wall member with a distance g therebetween. When the axial length l of the inner cylindrical space of the bushing is determined as $l \geq g/4$ and further the difference in diameter between the wall through hole $\phi_1$ and the inner cylindrical space $\phi_2$ of the bushing is determined as $\phi_2 - \phi_1 \geq 4$ mm, it is possible to effectively prevent dielectric breakdown along the surface of the bushing. Owing to the above arrangement, it is possible to effectively reduce the size, space, weight, cost, etc. of the bushing, as compared with conventional ones.

8 Claims, 22 Drawing Figures

IN MIXTURE (SF6, AIR) AT 1 atm

IN MIXTURE (90% SF6, 10% AIR) AT 1 atm
(NEGATIVE IMPULSE TEST)

GAS INSULATED METAL-CLAD HIGH VOLTAGE EQUIPMENT WITH INSULATING BUSHING

BACKGROUND OF THE INVENTION

1. Field of the Invention

The present invention relates generally to a gas insulated metal-clad high voltage equipment with an insulating bushing, and more particularly to a gas insulated metal-clad high voltage equipment provided with a single or a plurality of conductors disposed so as to pass through a grounded metal wall of a compartment and the insulating bushing filled with an insulating gas.

2. Description of the Prior Art

It is well knwon that dielectric strength of insulating gas or a mixture of insulating gas and air is greater than that of earth's atmosphere. Therefore, when high voltage devices for metal-clad power equipment are housed within a compartment filled with insulating gas, it is possible to reduce the size or the installation space of the power equipment.

In practice, however, it is usually impossible to house the whole high-voltage devices within the compartment filled with the insulating gas, because some devices should often be connected to or disconnected from another device installed outside the compartment or be checked in the outside for inspection or maintenance.

Taking the case of an enclosed switchgear as an example of gas insulation metal-clad power equipment, high voltage supply bus bars and load side bus bars are all housed within a grounded metal-clad bus compartment filled with insulating gas, but a circuit interrupter is installed outside the bus compartment in air. Therefore, in order to connect the devices housed within the bus compartment to those installed outside, some conductors should be disposed passing through the wall of the metal-clad compartment. The conductors should of course be insulated from the grounded compartment wall by appropriate insulating bushings. Various insulating bushings for insulating the conductor from the grounded compartment wall have been known. However, the size or dimensions of the insulating bushing are inevitably increased outside the bus compartment in order to prevent flashoever (dielectric breakdown on or along the surface of an insulator) from being generated between the conductor and the compartment wall within the surrounding air ambience. This is because flashover voltage is intended to be increased in dependence upon only an increase in flashover distance (distance along the surface of the insulator). Further, if the flashover distance is excessively increased, there exists another problem in that dielectric breakdown may occur between the conductor and the wall directly through inside the insulating bushing without occurrence of flashover along the surface of the insulator, thus it being impossible to effectively increase flashover voltage.

The advantage of the use of gas insulation metal-clad power equipment is to reduce the size of the equipment. However, this purpose is defeated when the dimensions of the insulating bushing are excessively great, thus resulting in high cost, heavy weight and large installation space requirements, etc.

SUMMARY OF THE INVENTION

With these problems in mind, therefore, it is the primary object of the present invention to provide the smallest possible insulating bushing for gas insulated metal-clad power equipment without deteriorating the dielectric strength between a conductor passing through a gounded compartment wall of the equipment and the grounded compartment wall.

To achieve the above-mentioned object, an insulating bushing for a gas insulated housing for metal-clad power equipment filled with an insulating gas and, having: a grounded compartment wall including a grounded compartment wall member; a cylindrical insulating bushing air-tightly fixed to the grounded wall member formed with a through hole; and a loaded conductor supported by the cylindrical insulating bushing at the center thereof for connecting the power device housed inside the gas insulated housing to another device installed outside the gas insulated housing, the conductor passing through an inner cylindrical space of the bushing filled with the insulating gas. One end of the cylindrical bushing being air-tightly fixed to the grounded compartment wall member in such a way that an outer circumferential surface of the loaded conductor directly faces an inner circumferential surface of the through hole formed in the grounded compartment and being separated therefrom by a distance g. The outer circumference surface of the loaded conductor being air-tightly supported by the other or bottom end of the cylindrical bushing. An axial length l of the inner cylindrical bushing space of the bushing filled with an insulating gas being equal to or longer than a quarter of the space distance g ($l \geq g/4$), the axial length l of the inner cylindrical space of the bushing being roughly equal to a diameter $\phi_1$ of the through hole under the optimum condition ($l \approx \phi_1$).

Further, a difference between a diameter $\phi_2$ of the inner cylindrical space and a diameter $\phi_1$ of the through hole is equal to or larger than 4 mm ($\phi_2 - \phi_1 \geq 4$).

Further, in the case where the conductor is divided into an inner fixed conductor and an inner movable conductor with a disconnection position provided within the inner cylindrical space of the insulating bushing filled with the insulating gas, an insertion distance B of an end of the inner fixed conductor into the inner cylindrical space is equal to or longer than one-fifth of a distance g between the circumferential surface of the through hole and an outer circumferential surface of the conductor ($B \geq g/5$).

In the gas insulation metal-clad power equipment provided with the cylindrical insulating bushing according to the present invention as defined by the above dimensions, the dielectric strength between the conductor and the grounded compartment wall is rather dependent upon dielectric strength against dielectric breakdown within insulating gas ambience, than dependent upon that against flashover within air ambience, thus making the best use of the presence of insulating gas.

BRIEF DESCRIPTION OF THE DRAWINGS

The features and advantages of the insulating bushing for a gas insulated metal-clad power equipment according to the present invention over the prior-art equipment will be more clearly appreciated from the following description of the preferred embodiments of the invention and various experiments or tests taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a brief reference will be made to a gas insulation metal-clad power equipment provided with a prior-art cylindrical insulating bushing, with reference to the attached drawings.

Figure 1:
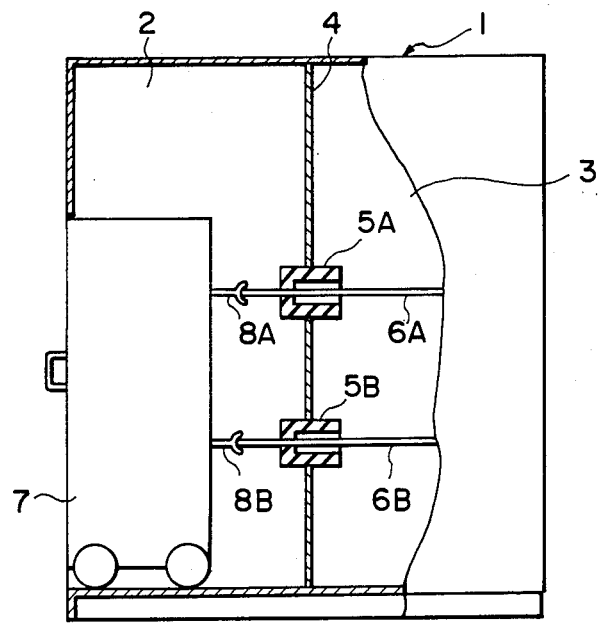
FIG. 1 is a diagrammatical fragment cross-sectional view showing an enclosed switchgear provided with a prior-art cylindrical insulating bushing by way of example of prior-art gas insulation power equipment.

FIG. 1 shows a gas insulation enclosed switchgear by way of example of the gas insulation metal-clad power equipment. In the drawing, the gas insulation switchgear compartment 1 of cubicle type is divided into two of a circuit breaker compartment 2 and a bus compartment 3 by a grounded metallic compartment wall 4. In the compartment wall 4, there are disposed two cylindrical insulating bushings 5A and 5B made of plastics or porcelain and fixed to the compartment wall 4 penetrating therethrough. Passing through a center of each cylindrical insulating bushing 5A or 5B, an inner fixed conductor 6A or 6B is fixed to the bushing at one end thereof and connected to a power supply bus or a load bus (both not shown), respectively, at the other end thereof. Within the circuit breaker compartment 2, a truck type circuit breaker 7 is movably housed. The breaker 7 is provided with two outer movable conductors 8A and 8B so as to be connected to or disconnected from the inner fixed conductors 6A and 6B, respectively, when moved to and from within the breaker compartment 2. Within the bus compartment 3, bus bars (not shown) are arranged. This bus compartment 3 is filled with an insulating gas such as $SF_6$ (sulfur hexafluoride gas), for instance, or a mixture of the gas and air under a pressure equal to or higher than the 1 atm. (i.e., 0.10 to 0.2 MPa). Therefore, when the movable breaker 7 is moved into the breaker compartment 2, and the two outer movable conductors 8A and 8B are brought into contact with the two inner fixed conductors 6A and 6B, respectively, the circuit breaker 7 is connected to the bus bars or load bars.

Figure 2:
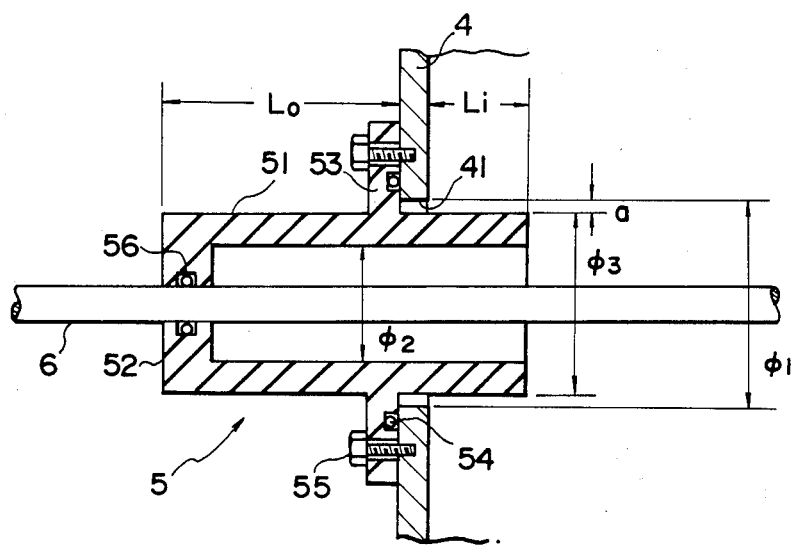
FIG. 2 is an enlarged cross-sectional view showing the prior-art cylindrical insulating bushing.

The present invention closely relates to the cylindrical insulating bushing 5A or 5B. Therefore, only the cylindrical insulating bushing will be described in further detail with reference to FIG. 2. In FIG. 2 a through hole 41 is formed in the grounded metallic compartment wall 4, through which the cylindrical insulating bushing 5 is disposed and fixed. In more detail, the bushing 5 is formed with a cylindrical wall 51, a bottom end 52 and a flange 53. The flange 53 is air-tightly fixed to the compartment wall 4 from the oustide via a sealing member such as an O ring 54 by use of bolts 55. On the other hand, the inner fixed conductor 6 is also air-tightly fixed to the bottom end 52 of the bushing 5 via a sealing member such as another O ring 56, being passed through the center of the bushing 5. Further, in FIG. 2, $\phi_1$ denotes a diameter of the through hole 41 formed in the wall 4; $\phi_2$ denotes an inner diameter of the inner cylindrical wall 51 of the housing 5; $\phi_3$ denotes an outer diameter of the cylindrical wall 51 of the bushing 5 which is smaller than $\phi_1$; $L_i$ denotes an inner projection length of the bushing (between the inner surface of the wall 4 and the inner end surface of the cylindrical wall 51 of the bushing 5; $L_o$ denotes an outer projection length of the bushing (between the outer surface of the wall 4 and an outer surface of the bottom end 52 of the bushing 5; and a $(=\frac{1}{2}(\phi_1-\phi_3))$ denotes a gap between the circumferential surface of the through hole 41 and the outer circumferential surface of the cylindrical wall 51 of the bushing 5. Further, as described in more detail later, since flashover (dielectric breakdown along the surface of the insulator) readily occurs within the ambience rather than gas ($SF_6$) ambience, the outer projection length $L_o$ is usually determined longer than the inner projection length $L_i$.

Figure 3:
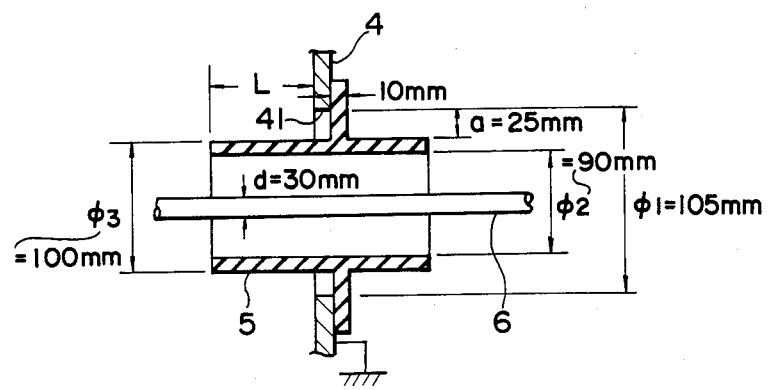
FIG. 3 shows an equivalent to the prior-art cylindrical insulating bushing of FIG. 2 in view of dielectric breakdown.

FIG. 3 shows an equivalent to the bushing 5 of FIG. 2 in view of the insulation standpoint. As shown in FIG. 3, a high voltage is applied between the conductor 6 and the grounded metallic compartment wall 4, and the equivalent to the bushing 5 lacks a bottom end. This is because various experiments have indicated that the bottom end 52 of the bushing 5 exerts neither a good or bad influence upon the flashover characteristics. This may be natural because when a high voltage is applied between the inner fixed conductor 6 and the compartment wall 4, flashover may occur along an outer cylindrical surface of the cylindrical wall 51 of the bushing 5.

Figure 4:
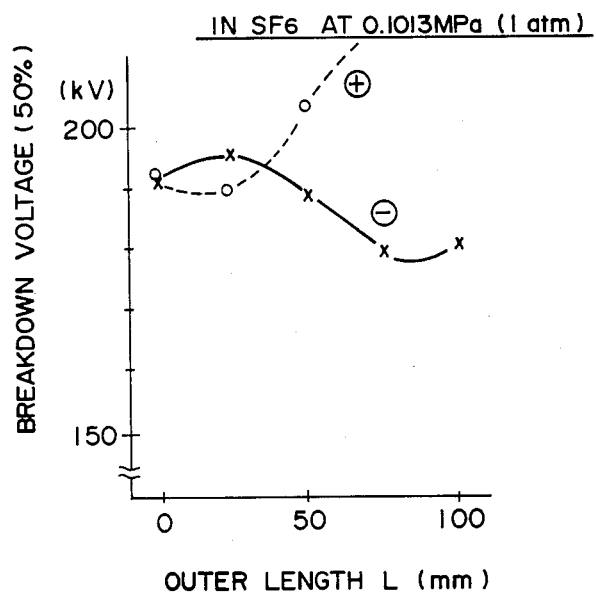
FIG. 4 is a graphical representation showing the dielectric breakdown test results of the bushing against both positive and negative polarity impulse voltages, which are obtained when the length L of the bushing is changed in $SF_6$ (insulating gas) at 1 atm: (=0.1013 MPa)

FIG. 4 shows test results of the relationship between the dielectric breakdown voltage (50% in occurrence probability) and the outer projection length L of the bushing 5. The Y-axis of FIG. 4 represents a breakdown voltage in 50% probability of occurrence at a unit of kV. Hereinafter, the Y-axes of FIGS. 8B, 9, 10, 11A, 11B, 12 and 16B represent the same as that of FIG. 4. In this test, each dimensions are as follows: $\phi_1=105$ mm, $\phi_2=90$ mm, $\phi_3=100$ mm, a=2.5 mm, the thickness of the bushing flange 53 is 10 mm, the outer diameter of the conductor 6 (aluminum rod) is 30 mm, and the bushing 5 is disposed within a pure $SF_6$ gas ambient at a pressure roughly equal to 1 atm. (about 0.1 MPa). Further, a positive polarity impulse voltage and a negative polarity impulse voltage have been applied to the conductor 6, independently. Each impulse voltage (1.2×50 μs) has a crest width of about 1.2 μs and a duration of wave tail of about 50 μs.

The results shown in FIG. 4 indicate that breakdown voltages (voltages at which flashover occurs) in positive polarity intersect those in negative polarity near L=38 mm. That is, the more the projection length L; the higher the positive impulse breakdown voltage, but the lower the negative impulse breakdown voltage. The reason why the above dielectric breakdown characteristics are obtained may be due to the fact that the cylindrical insulating bushing 5 is disposed penetrating the wall 4 and further there exists a gap a between the inner fixed conductor 6 and the through hole 41.

The above test indicates that as far as the equivalent to the cylindrical insulating bushing 5 as shown in FIG. 3 is disposed being passed through the wall 4, even if the projection length L (flashover distance) 5 is increased to increase the flashover distance between the inner fixed conductor 6 and the wall 4, it is impossible to simultaneously increase the breakdown voltage for both positive and negative polarity impulse voltage applied to the conductor 6. Of course, when the projection length L is further increased beyond the minimum point (L=90), the negative polarity impulse breakdown voltage may be increased. However, there exist other problems in that the size or dimensions of the bushing 5 is increased beyond the practical use or else another dielectric breakdown may occur directly through inside the cylindrical insulating bushing 5 between the conductor 6 and the grounded wall 4 without occurrence of flashover along the surface of the insulator, thus it being impossible to effectively increase only the breakdown voltage.

In view of the above description, reference is now made to gas insulation metal-clad power equipment provided with the cylindrical insulating bushing according to the present invention.

Figure 5:
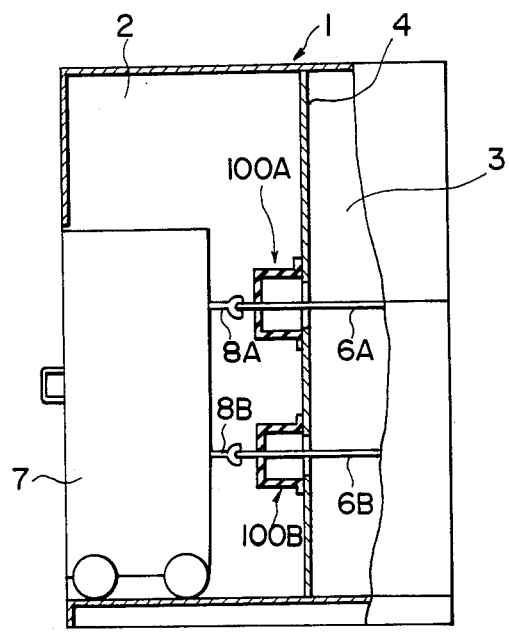
FIG. 5 is a diagrammatical fragment cross-sectional view showing an enclosed switchgear provided with a first embodiment of the cylindrical insulating bushing according to the present invention, however associated O-rings and bolts-nuts being omitted for clarity.

FIG. 5 shows an enclosed switchgear by way of example, to which a first embodiment of the cylindrical insulating bushing according to the present invention is applied. The gas insulation enclosed switchgear 1 shown in FIG. 5 is the same as the same in structure as the prior art one shown in FIG. 1 except the insulating bushings 100A and 100B. Therefore, the structural features and functional effects of this enclosed switchgear other than those of the insulating bushings are substantially the same as with the prior art ones previously described. The same references have been retained for similar parts or sections have the same functions and any detailed description of them is believed to be unnecessary.

In FIG. 5, it should be noted that a cylindrical insulating bushing 100A according to the present invention is fixed to the metallic compartment wall 4 projecting toward the outside, in particularly toward the outer atmosphere side, without penetrating through the wall 4. This structure of the cylindrical insulating bushing 100A is the primary feature of the present invention.

The above structure will be described in further detail with reference to FIG. 6. The bushing 100 made of plastics or porcelain according to the present invention is formed with a cylindrical wall 101, a bottom end 102 and a flange surface 103. Similarly, the flange 103 is air-tightly fixed to the grounded metallic compartment wall 4 through a sealing member such as an O ring 54 by use of bolts 55. On the other hand, the inner fixed conductor 6 is air-tightly fixed to the bottom end 102 of the bushing 100 at its center through a sealing member such as another O ring 56 passing through the inner cylindrical space thereof.

Figure 6:
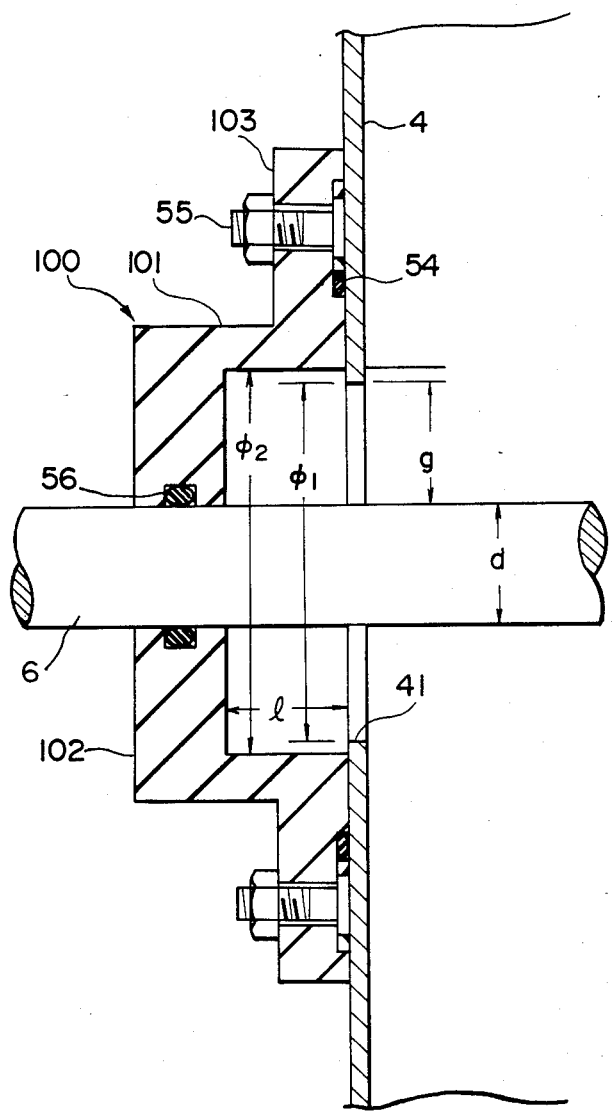
FIG. 6 is an enlarged and detailed cross-sectional view showing the first embodiment of the cylindrical insulating bushing according to the present invention a disconnection portion formed between an outer movable conductor and an inner fixed conductor being placed outside the cylindrical insulating bushing.

In FIG. 6, $\phi_1$ denotes a diameter of the through hole 41 formed in the wall 4, $\phi_2$ denotes an inner diameter of the cylindrical wall 101 and the flange 103 of the bushing 100 which is larger than $\phi_1$, l denotes a length of the inner projecting cylindrical space of the bushing 100, g denotes a distance between the circumferential surface of the through hole 41 and the outer circumferential surface of the inner fixed conductor 6, and d denotes the diameter of the conductor 6.

The practical dimensions of the above conductor 6, the through hole 41 and the cylindrical insulating bushing 100 are, for instance, as follows: d=30 mm, g=30 mm, $\phi_1$=90 mm, $\phi_2$=95 mm l=30 mm.

Here, it should be noted that the dimensions satisfy the following conditions: l=g, $\phi_2 > \phi_1$ and $\phi_2 - \phi_1 = 5$ mm.

That is, the length l of the inner cylindrical space is roughly equal to the distance g between the through hole 41 and the conductor 6; the inner diameter $\phi_2$ of the bushing 100 is greater than the diameter $\phi_1$ of the through hole 41; and the diameter $\phi_1$ of the through hole 41 is smaller by about 5 mm than the inner diameter $\phi_2$ of the bushing 100. The reason why $\phi_1$ is smaller than $\phi_2$ is to positively allow dielectric breakdown to be produced between the grounded metallic wall 4 and the conductor 6. Further, the through hole 41 is cleanly formed and has no burrs.

The relationship between the above dimensions g, l, $\phi_1$ and $\phi_2$ will be described hereinafter in greater detail on the basis of various test results, with reference to the attached drawings. Further, the dielectric breakdown tests have been conducted both within the pure gas (100% SF$_6$) and within the mixture of air and gas (SF$_6$), separately.

[I] In SF$_6$ gas at 1 atm. (=0.01013 MPa) (one atmospheric pressure)

(a) Without cylindrical insulating bushing

Figure 7A:
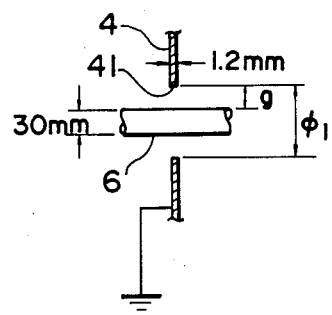
FIG. 7A shows a condition in which a conductor passes through a through hole in a grounded metal compartment wall.

FIG. 7A illustrates the test conditions in which a through hole 41 is formed in the wall 4 and only the conductor 6 is passed therethrough. The thickness of the wall 4 is 1.2 mm; the diameter of the conductor (aluminum rod) 6 is 30 mm. The diameter $\phi_1$ of the through hole 41 is changed to vary the distance g between the hole 41 and the conductor 6. The test box within which the above wall 4 and conductor 6 are housed is first evacuated and then filled with 100% SF$_6$ gas at 1 atm. (about 0.1 MPa). A high test voltage is applied to the conductor 6, and the wall 4 is grounded. The positive and negative polarity impulse dielectric breakdown voltages (voltages at which there is a fifty percent or more probability of breakdown have been determined at each distance g.

Figure 7B:
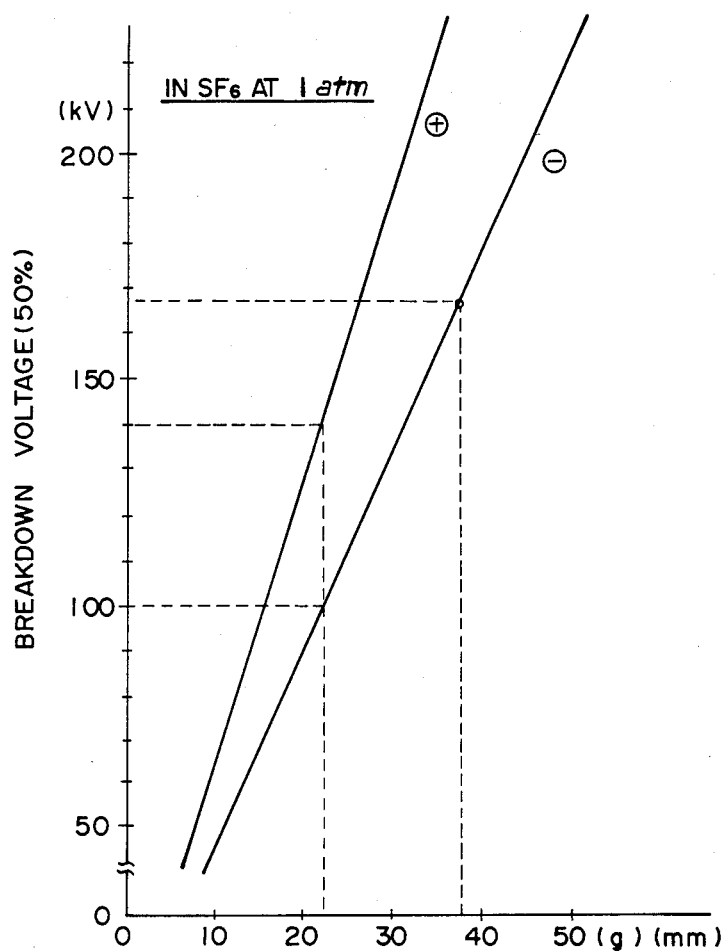
FIG. 7B is a graphical representation showing the dielectric breakdown test results of the bushing against both positive and negative polarity impulse voltages, which are obtained when the distance g between the wall and the conductor is changed in $SF_6$ at 0.1013 MPa (1 atmospheric pressure)

FIG. 7B shows the test results, which indicate that (1) the breakdown voltage increases in proportion to the distance g or the hole diameter $\phi_1$ for both positive and negative polarity impulse high voltages, and (2) the absolute value of the positive polarity impulse breakdown voltage is higher than that of the negative polarity impulse breakdown voltage.

(b) With cylindrical insulating bushing

Figure 8A:
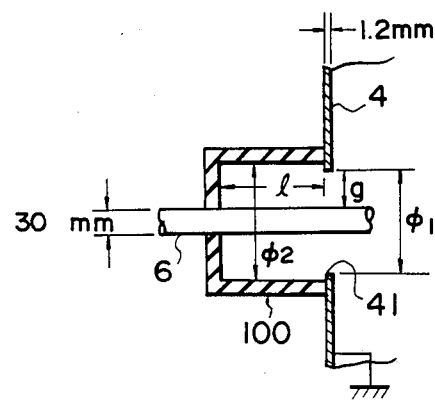
FIG. 8A shows an equivalent to the cylindrical insulating bushing of FIG. 6 in view of dielectric breakdown.

FIG. 8A illustrates the test conditions, in which the cylindrical insulating bushing 100 having a length l in the inner cylindrical space and made of a bakelite material is air-tightly fixed to the outer surface of the wall 4 under condition $\phi_1 < \phi_2$. The conductor 6 is also air-tightly passed through the cylindrical bushing 100. The test box having the wall 4 and the bushing 100 is filled with a gas of SF$_6$ at 1 atm. (about 0.10 MPa). The wall thickness is 1.2 mm, the conductor diameter d is 30 mm. In the first test, the dimensions of the bushing are as follows: $\phi_1$=75 mm, $\phi_2$=85 mm, $\phi_2 - \phi_1$=10 mm, g=22.5 mm. In the second test, the dimensions of the bushing are as follows: $\phi_1$=105, $\phi_2$=110, $\phi_2 - \phi_1$=5 mm, g=37.5 mm The length l of the bushing 100 is changed. A high test voltage is applied to the conductor 6 and the wall 4 is grounded. The positive and negative polarity impulse breakdown voltages (hereinafter expressed as their absolute values) have been determined for each length l when breakdown occurs in 50% probability.

Figure 8B:
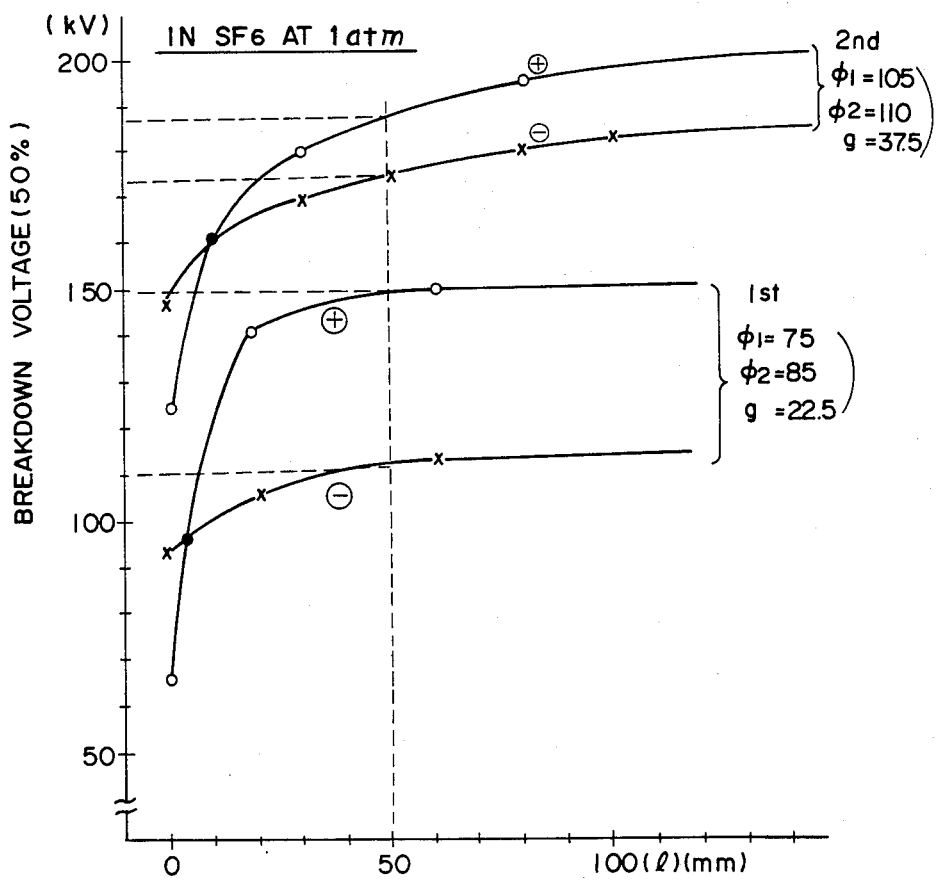
FIG. 8B is a graphical representation showing the dielectric breakdown test results of the bushing against both positive and negative polarity impulse voltages, which are obtained when the length l of the bushing is changed in $SF_6$ gas at 0.1013 MPa (1 atmospheric pressure)

FIG. 8B shows the test results, which indicate that (1) the breakdown voltage of positive polarity impulse is lower than that of negative polarity impulse when l=0, (2) as l increases, the breakdown voltage increases sharply of positive polarity impulst but that increase relatively gently of negative polarity impulse, (3) as l exceeds a certain value, the breakdown voltage of positive polarity impulse exceeds that of negative polarity impulse, and (4) the breakdown voltage is roughly saturated in both positive and negative polarity impulse when l exceeds further another value. In particular, FIG. 8B indicates that if l exceeds a predetermined value, the saturation of the breakdown voltage is caused due to the fact that the breakdown is mainly dependent upon the dielectric breakdown in the space g rather than dependent upon the dielectric breakdown (flashover) along the surface of the bushing 100, irrespective of the length l thereof. In other words, it is unnecessary to increase the length l of the bushing 100 beyond the predetermined value.

When comparing the test results between FIG. 7B (without bushing 100) and FIG. 8B (with bushing 100), the following results can be obtained as shown by the dashed lines in both the drawings.

|  | g | l | Impulse breakdown voltage(kV) | |
|---|---|---|---|---|
|  |  |  | Positive polarity | Negative polarity |
| Without bushing | 22.5 | — | 140 | 100 |
| (FIG. 7B) | 37.5 | — | — | 168 |
| With bushing | 22.5 | 50 | 150 | 110 |
| (FIG. 8B) | 37.5 | 50 | 188 | 174 |

Figure 9:
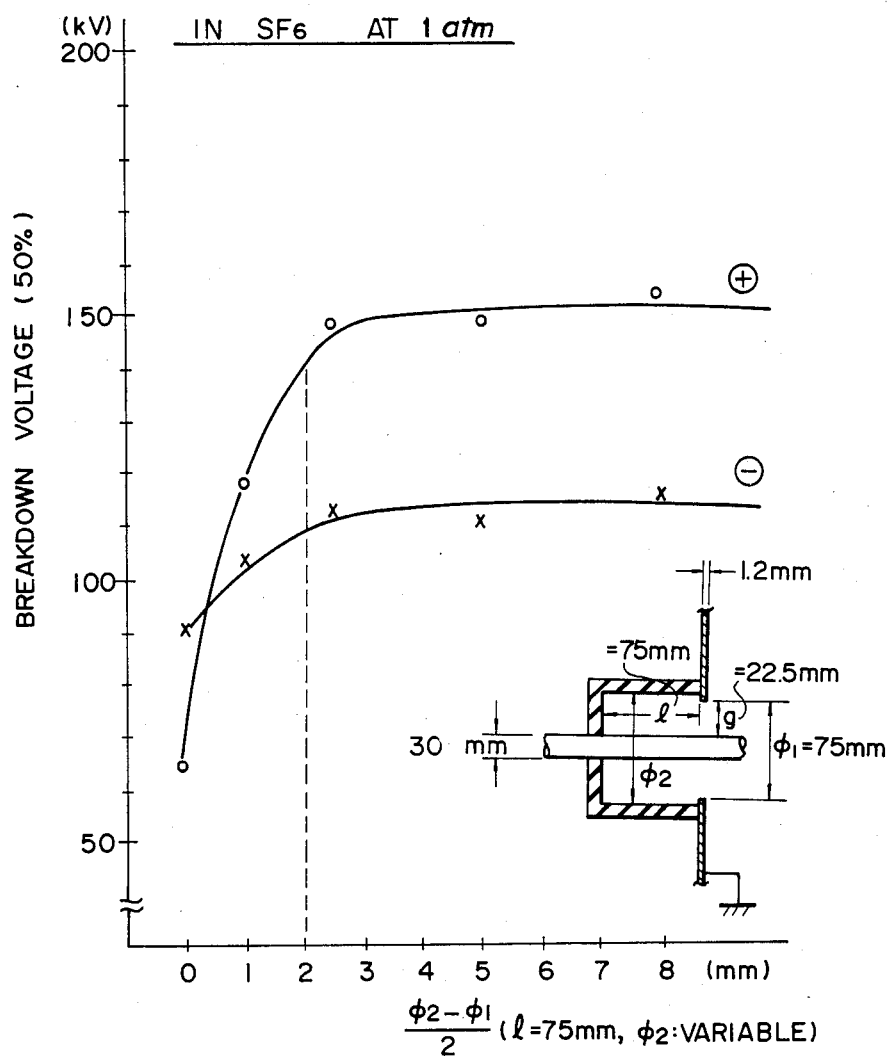
FIG. 9 is a graphical representation showing the dielectric breakdown test results of the bushing against both positive and negative impulse polarity voltages, which are obtained when the diameter $\phi_2$ of the inner space of the cylindrical insulating bushing is changed in $SF_6$ gas at 0.1013 MPa (1 atmospheric pressure)

The above table indicates that the breakdown voltage is improved by about 10 kV in the case where bushing 100 having the length l=50 is attached as compared with the case where no bushing 100 is attached In addition, FIG. 9 shows the other test results similar to those shown in FIG. 8B. The test conditions of FIG. 9 roughly correspond to the first test shown in FIG. 8B as follows: d=30 mm, $\phi_1$=75 mm, g=22.5 mm. However, in this test, the length l of the bushing 100 is fixed at l=75 mm but the inner diameter $\phi_2$ of the bushing 100 is changed from 75 to 91 mm; that is, ($\phi_2 - \phi_1$) is varied from 0 to 16 mm.

The above test results shown in FIG. 9 indicates that the breakdown voltage is roughly saturated when ($\phi_2 - \phi_1$)/2 is 2 mm or more, and sharply lowered when ($\phi_2 - \phi_1$)/2 is less than 2 mm. The above ($\phi_2 - \phi_1$)/2 indicates a projection distance of the wall 4 into the inner cylindrical space of the bushing 100. Therefore, the above test results indicates if the wall projection length is 2 mm or more when l=75 mm, the breakdown voltage is dependent upon dielectric breakdown in the space g rather than the dielectric breakdown (flashover) along the bushing surfaces.

(c) Conclusion of the above tests in $SF_6$ gas (i) With reference to FIG. 8B, the positive and negative polarity impulse breakdown voltages are equal to each other when l is roughly 5 mm and g=22.5 mm or when l is roughly 10 mm and g=37.5 mm. That is, the relationship between l and g is l/g=5/22.5 or 10/37.5, or l≈g/4.

In other words, the length l of the inner cylindrical space of the cylindrical insulating bushing 100 is effective upon an improvement in breakdown voltage when l≧g/4. In FIG. 8B, the breakdown voltage is not improved when l is increased beyond 75 mm in the first test ($\phi_1$=75, $\phi_2$=85, g=22.5) or when l is increased beyond 105 mm in the second test ($\phi_1$=105, $\phi_2$=110, g=37.5). That is to say, the breakdown voltage is not improved when l is increased beyond $\phi_1$ irrespective of the value of g. The length l of the inner space of the cylindrical insulating bushing 100 should preferably be equal to or more than g/4 and optimum when l≈$\phi_1$. Of course, it is possible to determine l to be more than $\phi_1$ due to requirements other than breakdown voltage, as where a current transformer is installed outside the cylindrical insulating bushing 100.

(ii) With reference to FIG. 9, the high saturated positive and negative polarity impulse breakdown voltages can be obtained when ($\phi_2-\phi_1$)/2≧2 mm; that is, when the diameter $\phi_1$ of the wall hole 41 is smaller by 4 mm or more than the inner diameter $\phi_2$ of the bushing 100.

[II] In mixture of $SF_6$ and air at 1 atm. (=0.1013 MPa)

(a) Without cylindrical insulating bushing 100

Figure 10:
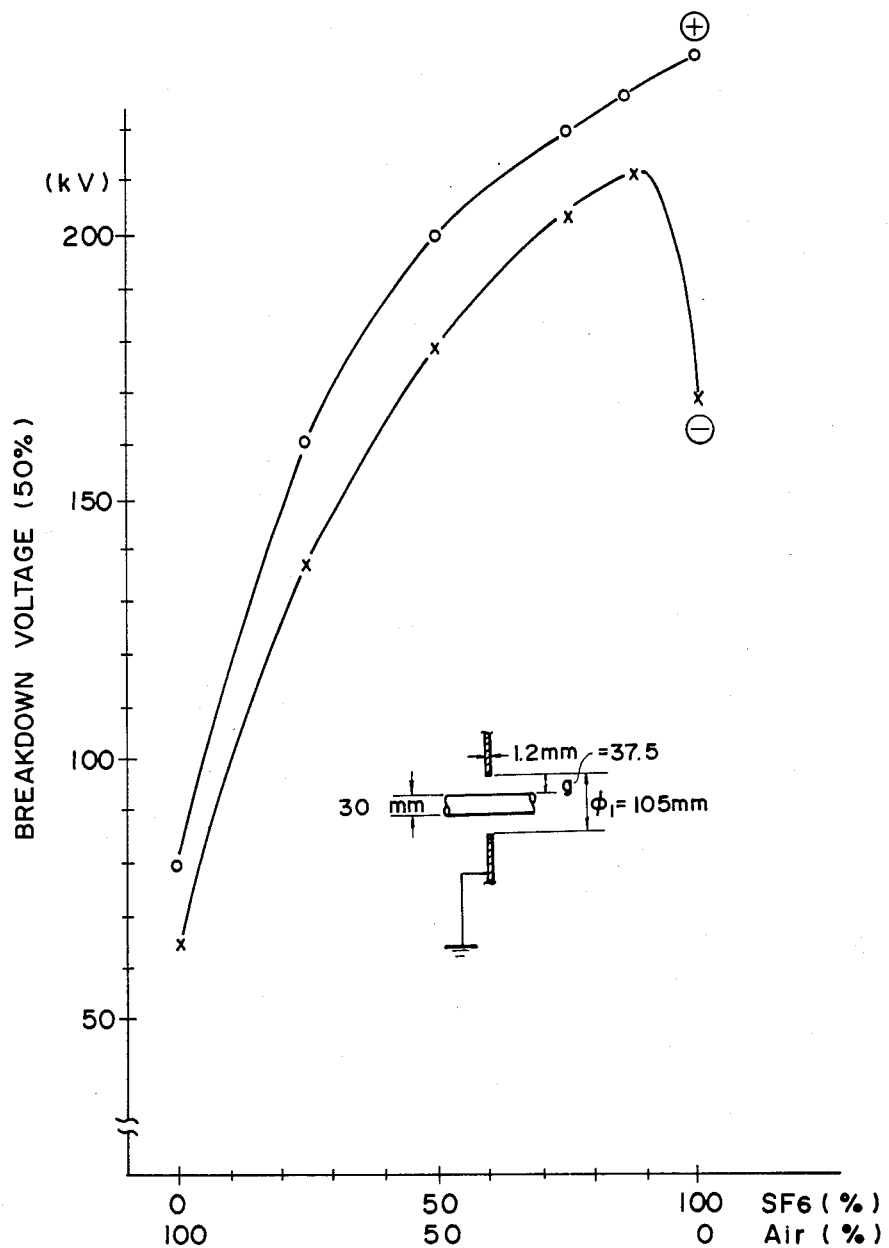
FIG. 10 is a graphical representation showing the dielectric breakdown test results of the bushing against both positive and negative polarity impulse voltages, which are obtained when the mixture ratio of $SF_6$ gas to air is changed.

Conventionally, it has been well known that breakdown voltage can be improved within a mixture of $SF_6$ and air as compared with within a pure $SF_6$ gas. The following test has been conducted to examine an optimum mixture ratio of $SF_6$ to air. As illustrated in FIG. 10, the test conditions roughly correspond to those shown in FIG. 7A. In this test, however, the diameter $\phi_1$ of the through hole 41 is fixed at 105 mm, and therefore the distance g between the hole 41 and the conductor 6 is fixed at 37.5 mm. In comparison of both the drawings (FIGS. 7B and 10), the dielectric breakdown voltage at g=37.5 mm in FIG. 7B corresponds to that at $SF_6$=100% in FIG. 10. The test voltage applied to the conductor 6 is an impulse voltage (1.2×50 μs) having a crest width of about 1.2 μs and a duration of wave tail of about 50 μs.

As can be seen from the graph of FIG. 10, although pure $SF_6$ provided the greatest breakdown voltage when positive impulse voltage was applied to the conductor 6, a mixture of 90 vol.% $SF_6$ and 10 vol.% air provided the greatest breakdown voltage when a negative impulse voltage was applied to the conductor 6. Therefore, since breakdown voltage was less when a negative voltage was applied to the conductor 6 and a mixture of 10 vol.% air and 90 vol.% $SF_6$ provided the greatest breakdown voltage when the negative impulse voltage was applied to the conductor 6, the mixture of 10 vol.% air and 90 vol.% $SF_6$ is best if the conductor must be used for both negative and positive current; and it is possible to obtain dielectric breakdown voltages equivalent to or more than those in pure gas ($SF_6$=100%) whenever the mixture includes 40 vol.% or more $SF_6$ gas. That is, it is possible to further increase the voltage passed through the conductor 6 if the mixture of $SF_6$ and air includes 40 vol.% or more $SF_6$, preferably 90 vol.% $SF_6$.

(b) With cylindrical insulating bushing

Since it has been established that a mixture of 90 vol.% $SF_6$ and 10 vol.% air at one atmospheric pressure (about 0.1 MPa) is optimum against dielectric breakdown, the following tests have further been performed within the above mixture of 90 vol.% $SF_6$ and 10 vol.% air.

Figure 11A:
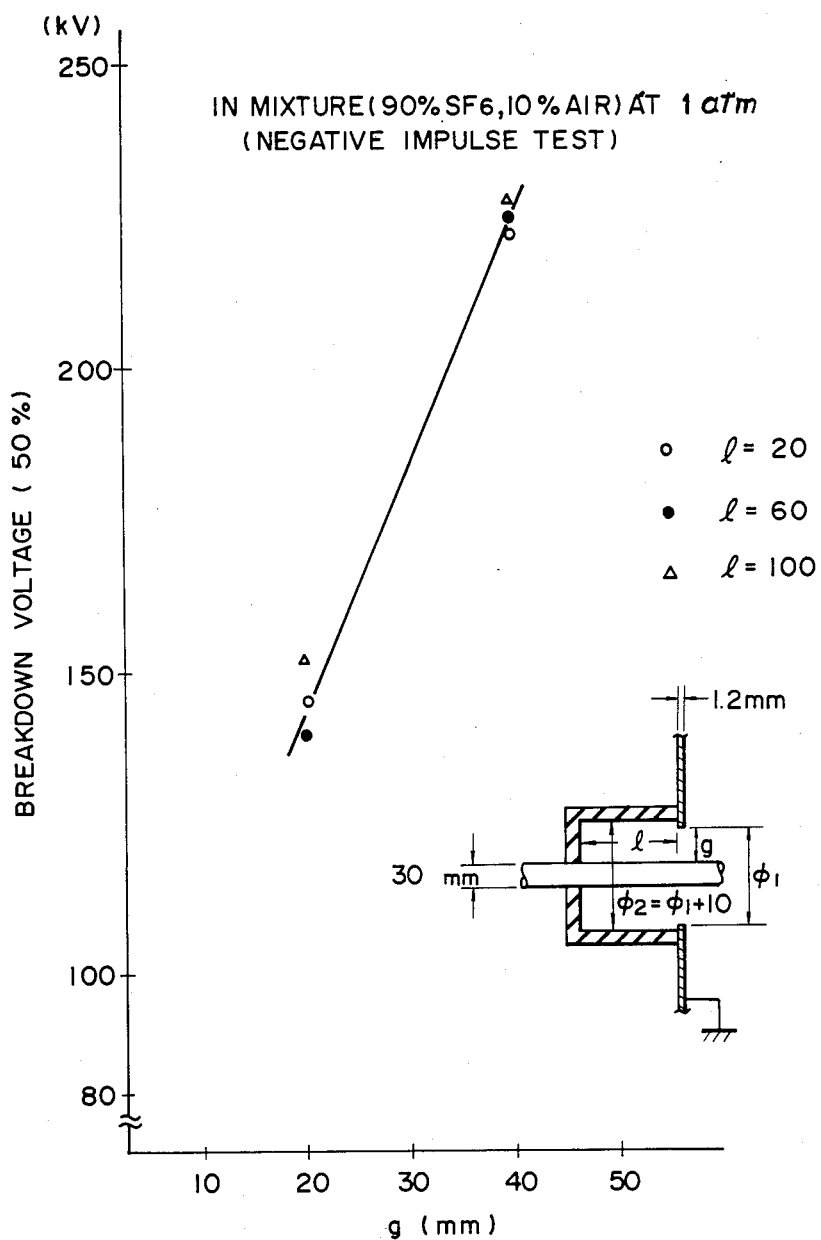
FIG. 11A is a graphical representation showing the dielectric breakdown test results of the bushing against negative polarity impulse voltage, which are obtained when the distance g between the wall and the conductor is changed with the length l of the bushing as parameter in a mixture of 90 vol.% $SF_6$ gas and 10 vol.% air at 0.1013 MPa (1 atmospheric pressure)

(i) FIG. 11A illustrates the results of a test, in which the distance g has been varied with the length l as parameter under the condition that $\phi_2=\phi_1+10$ mm. Here, it should be noted that ($\phi_2-\phi_1$)/2=5 mm, because FIG. 9 indicates that the dielectric breakdown voltage is roughly constant if ($\phi_2-\phi_1$)/2 exceeds 2 mm and that it is possible to neglect the influence of the presence of the cylindrical insulating bushing 100 upon the dielectric breakdown of the distance g between the cylindrical surface of the conductor 6 and the peripheral surface of the through hole 41 when $\phi_2$ is equal to $\phi_1$+10 mm. Further, in this test, the inner edge of the through hole 41 is deburred.

Further, the impulse voltage (1.2×50 μs) of only the negative polarity has been applied to the conductor. This is because dielectric breakdown voltage in the embodiments of the invention is usually lower in negative polarity than in positive polarity, so that it is possible to know the tendency of the insulation characteristics when negative impulse test voltages are applied to the conductor.

FIG. 11A indicates that the dielectric breakdown voltage obtained within a mixture of 90 vol.% $SF_6$ and 10 vol.% air with use of the cylindrical insulating bushing 100 as shown in FIG. 11A is considerably higher than that obtained within a pure $SF_6$ gas without use of the cylindrical insulating bushing and is not almost influenced by varieties of the length l in the range of 20 mm to 100 mm if the distance g is 20 mm or more.

Figure 11B:
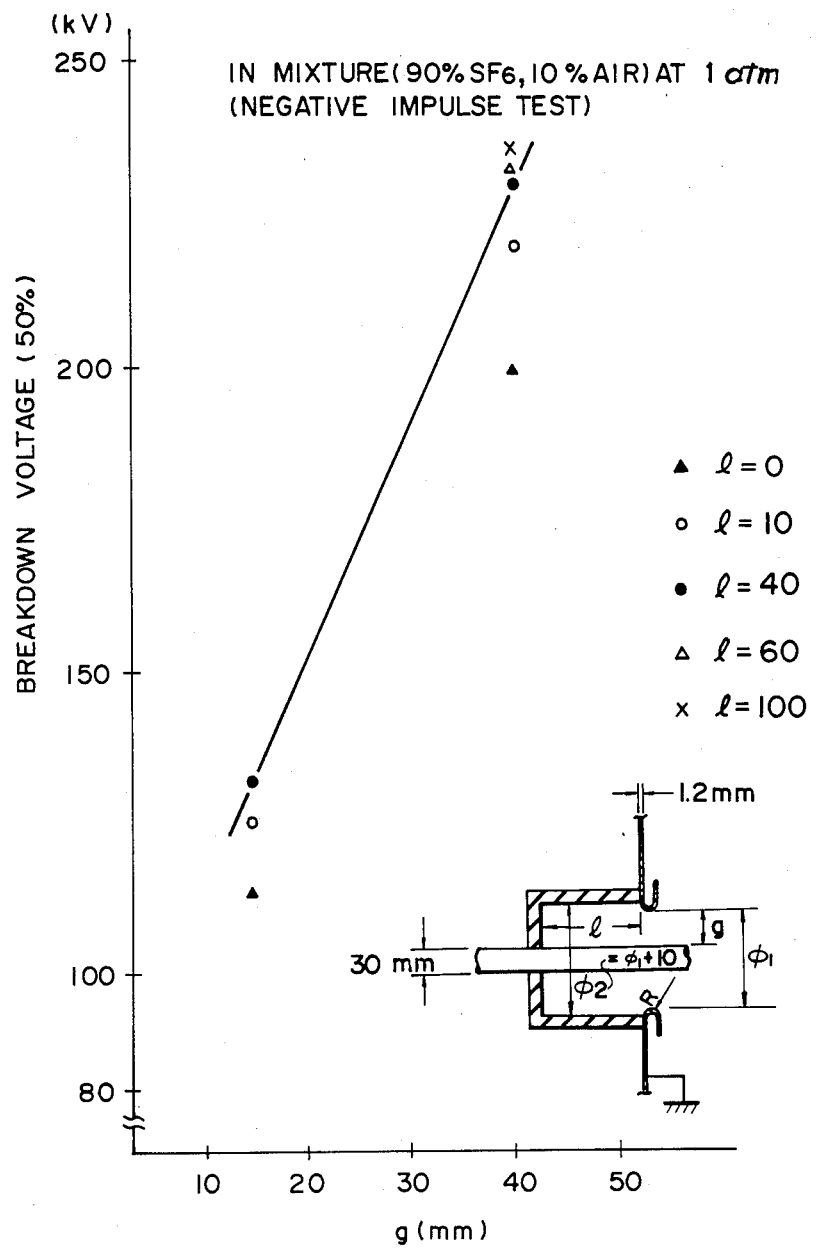
FIG. 11B is a graphical representation similar to FIG. 11A, which are obtained when the edge of a through hole formed in the wall is rounded.

(ii) In order to examine the influence of the edge condition of the through hole 41 upon the dielectric breakdown voltage, another test has been performed by bending the inner edge of the through hole 41 at a radius of curvature (R=10 mm). as depicted in FIG. 11B, in the same way as in FIG. 11A.

The graph of FIG. 11B indicates that the breakdown voltage is relatively low when l varies between 0 and 10 mm, but substantially equal when l ranges between 40 and 100 mm. Further, although the breakdown voltage is a little (about 5 kV) improved, it is possible to determine that there exists no marked difference between the two embodiments; that is, it is unnecessary to round the inner edge of the through hole if the inner edge of the through hole is deburred.

(iii) Further tests have been made for both the structure (A) where the edge of the through hole 41 is deburred as shown in FIG. 11A and the structure (B) where the edge of the through hole 41 is rounded as shown in FIG. 11B in order to reduce the length l of the inner cylindrical space of the cylindrical insulating bushing 100 as short as possible. In the tests, the dimensions are all fixed at two kinds for both the sturctures (A) and (B), respectively, as follows: $\phi_1$=75 mm, $\phi_2$=85 mm, g=22.5 mm and $\phi_1$=105 mm, $\phi_2$=115 mm, g=37.5 mm, while the length l of the bushing 100 has been changed. The above dimensions are quite the same as those of FIG. 8B.

Figure 12:
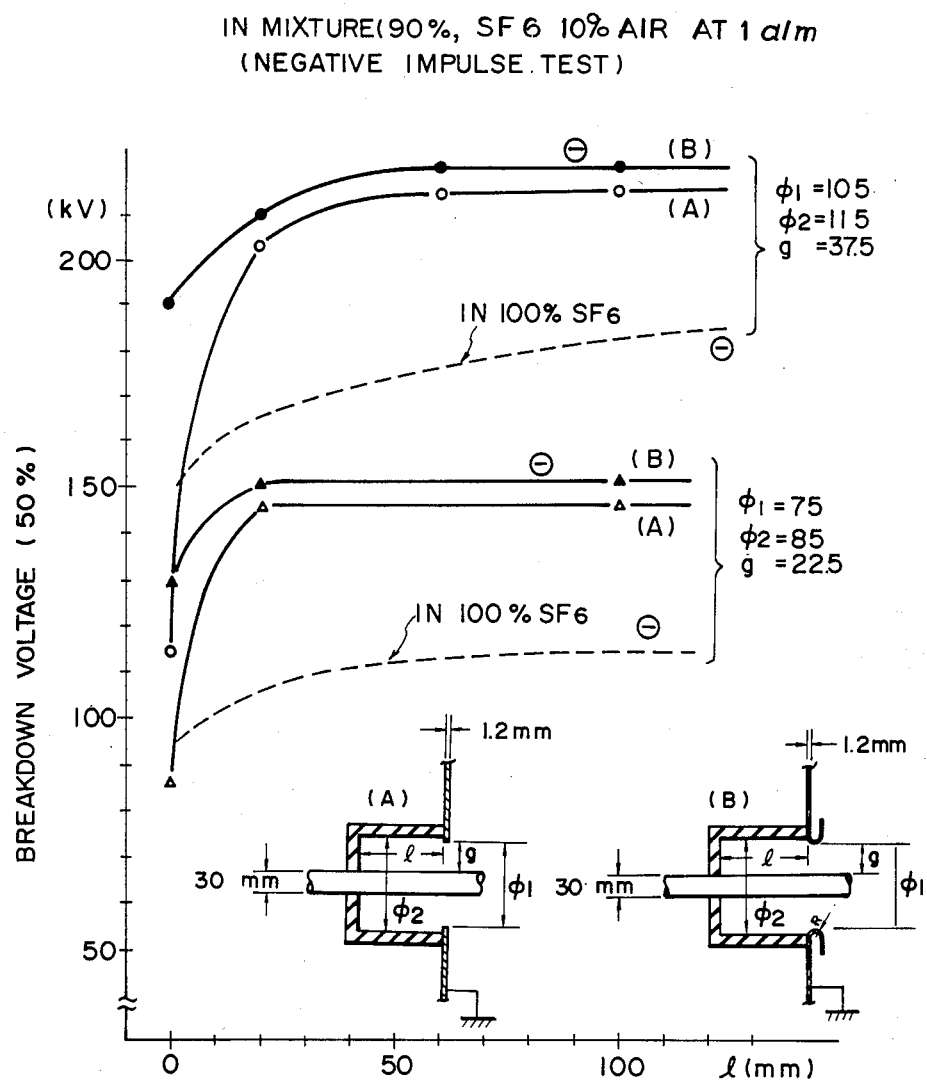
FIG. 12 shows a graphical representation showing the dielectric breakdown test results of the bushing against negative polarity impulse voltage, which are obtained when the length l of the bushing is changed in a mixture of 90 vol.% $SF_6$ gas and 10 vol.% air at 0.1013 MPa (1 atmospheric pressure) as classified according to the edge shape of the through hole.

FIG. 12 indicates that (1) the negative polarity impulse breakdown voltage at g=37.5 mm is higher than that at g=22.5 mm, (2) the breakdown voltage is almost constant when l exceeds 20 mm at g=22.5 mm or when l exceeds 50 mm at g=37.5 mm, (3) the breakdown voltage can be increased as compared with that obtained in pure SF$_6$ atmosphere (FIG. 8B), as depicted by dashed lines in FIG. 12, and (4) the difference in breakdown voltage between the two structures (A) and (B) is relatively small.

(c) Conclusion of the above tests in mixture of SF$_6$ and air (i) A mixture of SF$_6$ and air is superior to pure SF$_6$ gas. A mixture of 40 vol.% or more SF$_6$ and a remaining air is preferable and that of 90 vol.% SF$_6$ and 10 vol.% air is the best.

(ii) Even if the edge of the through hole 41 is rounded, the breakdown voltage is not improved markedly. Therefore, it may be unnecessary to machine the through hole through complicated production processes. However, it is necessary to deburr the edge of the through hole.

In addition to the gas insulation enclosed switchgear as shown in FIG. 5, the cylindrical insulating bushing according to the present invention can be applied to other enclosed switchgears as described hereinbelow with reference to the attached drawings.

Figure 13:
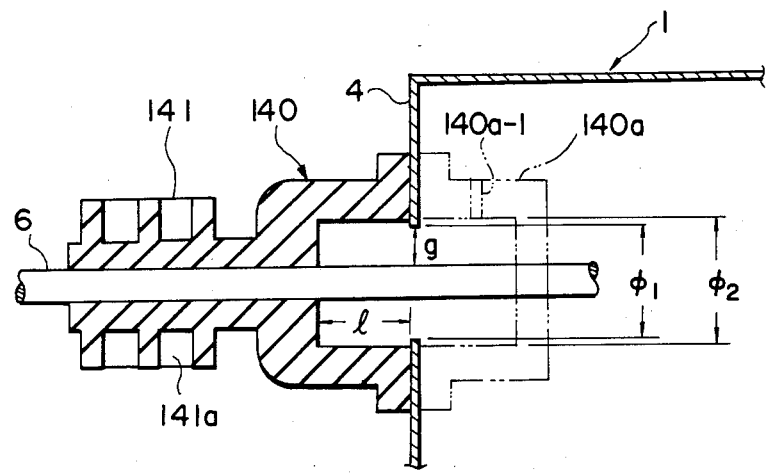
FIG. 13 is an cross-sectional view showing a second embodiment of the cylindrical insulating bushing according to the present invention.

FIG. 13 shows the second embodiment of the cylindrical insulating bushing 140 according to the present invention formed with another cylindrical extension 141 having plural annular grooves 141a for increasing the flashover distance within air ambience. In this case, the length l of the inner cylindrical space of the bushing 140 is determined to be l≧g/4. Further, in order to increase the supporting strength of the conductor 6, it is preferable to further provide another cylindrical insulating bushing 140a, as shown by the dot-dot-dashed lines in FIG. 13, within the switchgear 1. In this case, it is preferable to fill the space enclosed by two bushings 140 and 140a with the insulating gas in order to improve the dielectric breakdown due to the voltage of the conductor 6. To achieve this, a communication passageway 140a-1 is formed in the bushing 140a or the space enclosed by two bushings 140 and 140a is filled with another insulation gas.

Figure 14:
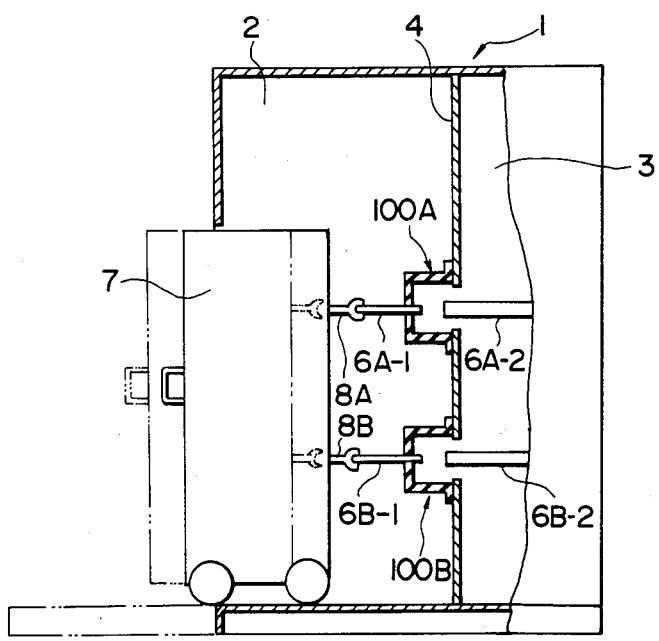
FIG. 14 is a diagrammatical fragment cross-sectional view showing another enclosed switchgear provided with the first embodiment of the cylindrical insulating bushing according to the present invention, however associated O-rings and bolts-nuts being omitted for clarity, a disconnection portion formed between an inner movable conductor and an inner fixed conductor being placed within the cylindrical insulating bushing.

FIG. 14 shows another gas insulation enclosed switchgear by way of example, to which the third embodiment of the cylindrical insulating bushing according to the present invention is applied. The enclosed switchgear 1 shown in FIG. 14 is substantially the same in structure as that shown in FIG. 5 except the inner fixed conductor 6A or 6B of FIG. 5 is replaced by the combination of the inner movable conductor 6A-1 or 6B-1 and the inner fixed conductor 6A-2 or 6B-2 of FIG. 14. Therefore, the same references have been retained for similar parts or sections without any description thereof.

The feature of the switchgear 1 is to disconnect the truck-type circuit breaker 7 from the inner fixed conductors 6A-2 and 6B-2 within the insulating gas ambience. This is because it is possible to increase the break down voltage as compared when the circuit breaker 7 is disconnected within air ambience and therefore to reduce the disconnected distance between two.

In more detail, the inner fixed conductor 6A or 6B shown in FIG. 5 is divided into an inner movable conductor 6A-1 or 6B-1 and an inner fixed conductor 6A-2 or 6B-2. The inner movable conductor 6A-1 or 6B-1 is movably supported by the cylindrical bushing 100A or 100B, respectively. The inner movable conductor 6A-1 or 6B-1 is connected to or disconnected from an outer movable conductor 8A or 8B of the circuit breaker 7 outside the switchgear 1 and further to or from the inner fixed conductor 6A-2 or 6B-2 inside the switchgear box 1.

In this switchgear, the inner movable conductors 6A-1 and 6B-1 are first disconnected from the inner fixed conductors 6A-2 and 6B-2 under non-loaded condition within the compartment 3 by moving the truck-type circuit breaker 7. In this moment, the movable conductors 6A-1 and 6B-1 are still in contact with the outer movable conductors 8A and 8B. Thereafter, the outer movable conductors 8A and 8B are disconnected from the inner movable conductors 6A-1 and 6B-1 under non-loaded condition in air ambience because the stop rings (refer to FIG. 15) fitted on the inner movable conductors 6A-1 and 6B-1 block further movements of the inner movable conductors 6A-1 and 6B-1.

In FIG. 14, it should be noted that the end of the inner fixed conductor 6A-2 or 6B-2 connected to power supply bus bars or load cables (not shown) projects beyond the compartment wall 4.

Figure 15:
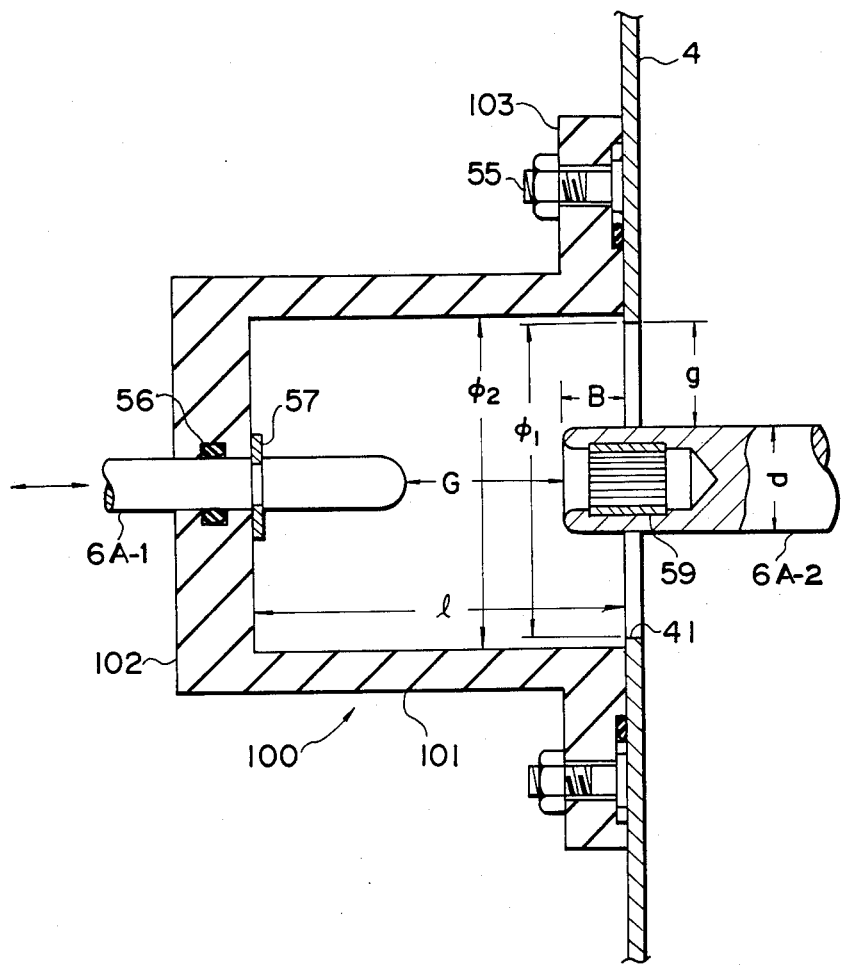
FIG. 15 is an cross-sectional view showing a third embodiment of the cylindrical insulating bushing according to the present invention.

FIG. 15 shows the third embodiment of the cylindrical insulating bushing 100 of FIG. 14. The insulating bushing 100 of FIG. 15 is similar to the insulating bushing 100 of FIG. 5. Therefore, the same reference numerals are applied to parts and sections similar to those of FIG. 5 without any descriptions thereof. In FIG. 15, the inner movable conductor 6A-1, the inner fixed conductor 6A-2, and the cylindrical insulating bushing 100 are enlarged in further detail. The inner movable conductor 6A-1 is air-tightly and movably disposed passing through the bottom end 102 of the bushing 100 via a sealing member 56. The reference numeral 57 denotes a stop ring fixed to the inner movable conductor 6A-1 at an appropriate position. The stop ring 57 blocks a further leftward movement of the inner movable conductor 6A-1 from the position as shown in FIG. 15 so that the inner movable conductor 6A-1 cannot pass leftward past the bottom end 102 of the cylindrical inculating bushing. It may be preferable to cover the conductor 6A-1 by an appropriate insulating material outside the bushing for safety.

The inner fixed conductor 6A-2 is formed with a multiple contact 59 at its end so as to be engageable with the end of the movable conductor 6A-1 when the conductor 6A-1 is moved toward the right side in FIG. 15. The end of the second fixed conductor 6A-2 projects by a distance B beyond the through hole 41 formed in the grounded metallic compartment wall 4 into the inner space of the bushing 100.

In FIG. 15, the typical dimensions are as follows: d=30 mm, G (disconnection gap between two conductors)=45 mm, g=30 mm, $\phi_1$=90 mm, $\phi_2$=95 mm, B=18 mm, l=110 mm.

Figure 16:
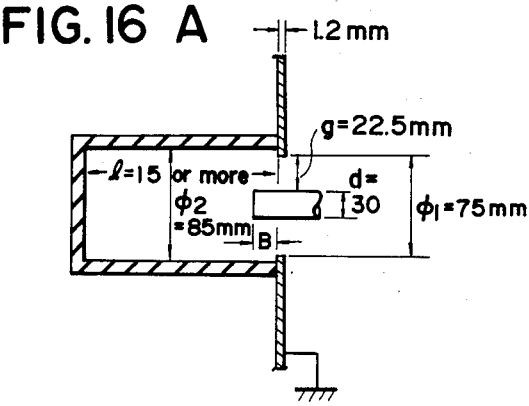
FIG. 16A shows an equivalent to the cylindrical insulating bushing of FIG. 15 in view of dielectric breakdown.
FIG. 16B is a graphical representation showing the dielectric breakdown test results of the bushing against negative polarity impulse voltage, which are obtained when the insertion distance B of the end of the inner fixed conductor into the inner cylindrical space is changed in $SF_6$ gas or a mixture of 90 vol.% $SF_6$ gas and 10 vol.% air at 0.1013 MPa (1 atmospheric pressure)
Figure 16:
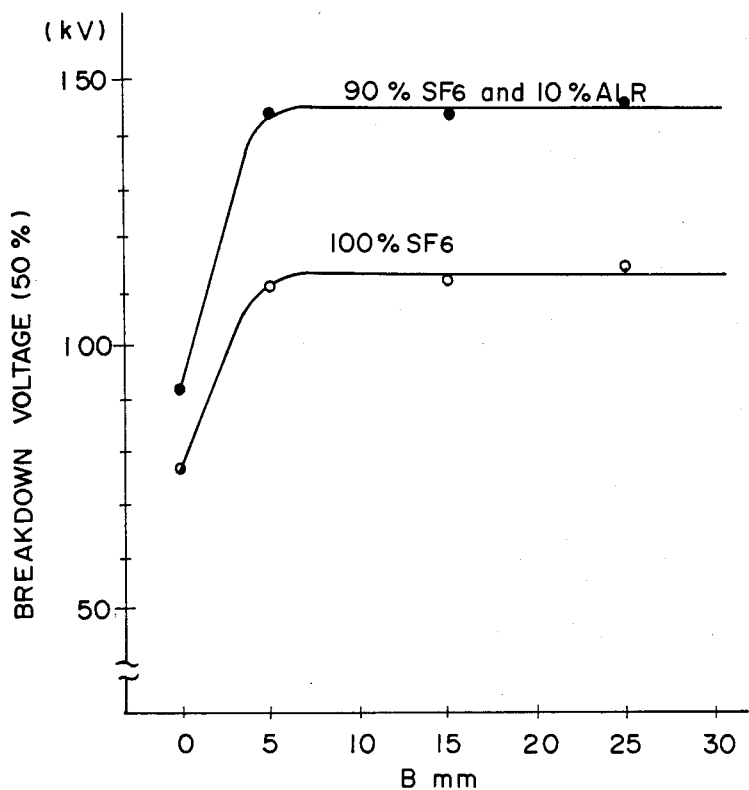

In order to determine the appropriate projection length B of the second inner fixed conductor 6A-2 into the bushing 100, further tests have been made. FIG. 16A shows the test conditions, in which d=30 mm, $\phi_1$=75 mm, $\phi_2$=85 mm, g=22.5 mm, and l=15 mm or more (long enough not to exert the influence thereof upon the breakdown voltage between the compartment wall 4 and the inner fixed conductor 6A-2.

FIG. 16B shows the test results, which indicate that it is possible to obtain stable breakdown voltages if the projection distance B is 5 mm or more. Since g is 22.5 mm, $B/g=5/22.5\approx1/5$, so that it is possible to obtain the preferable relationship between B and g as $B\geq g/5$ mm. Further, as compared with FIG. 12, the breakdown voltage 145 kV shown in FIG. 16B (when B is more than 5) is roughly equal to that 145 kV shown in FIG. 12 (when l (15 mm or more) is long enough at g=22.5 mm). In other words, even if the inner fixed conductor 6A-2 is disconnected from the inner movable conductor 6A-1 within the bushing 100, as far as the conductor 6A-2 projections B=5 mm or more into the cylindrical inner space of the bushing 100, it is possible to obtain the same stable breakdown voltage as in FIG. 12 where the conductor 6 is passed through the bushing 100.

Figure 17:
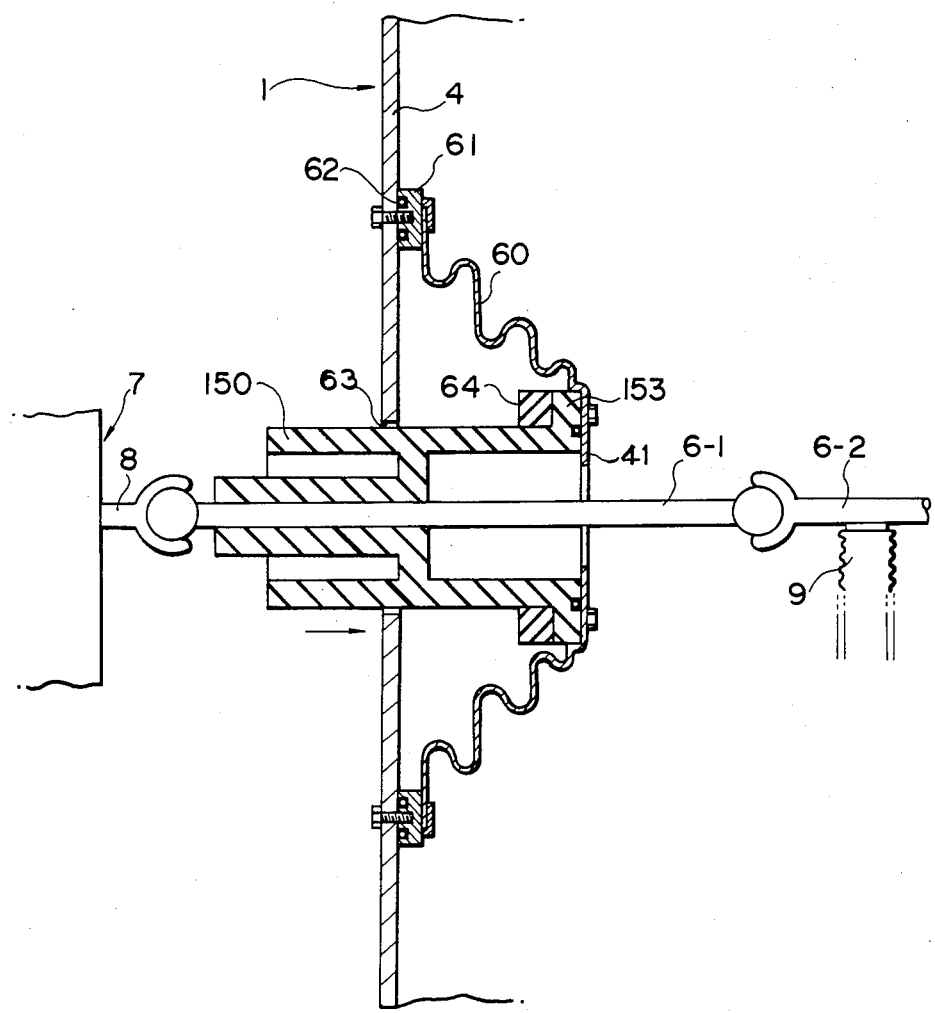
FIG. 17A is an enlarged cross-sectional view of a fourth embodiment of the cylindrical insulating bushing having a bushing cover of bellows according to the present invention.
FIG. 17B is an enlarged view similar to FIG. 17A, in which the bushing having an inner movable conductor is disconnected from an inner fixed conductor.
Figure 17B:
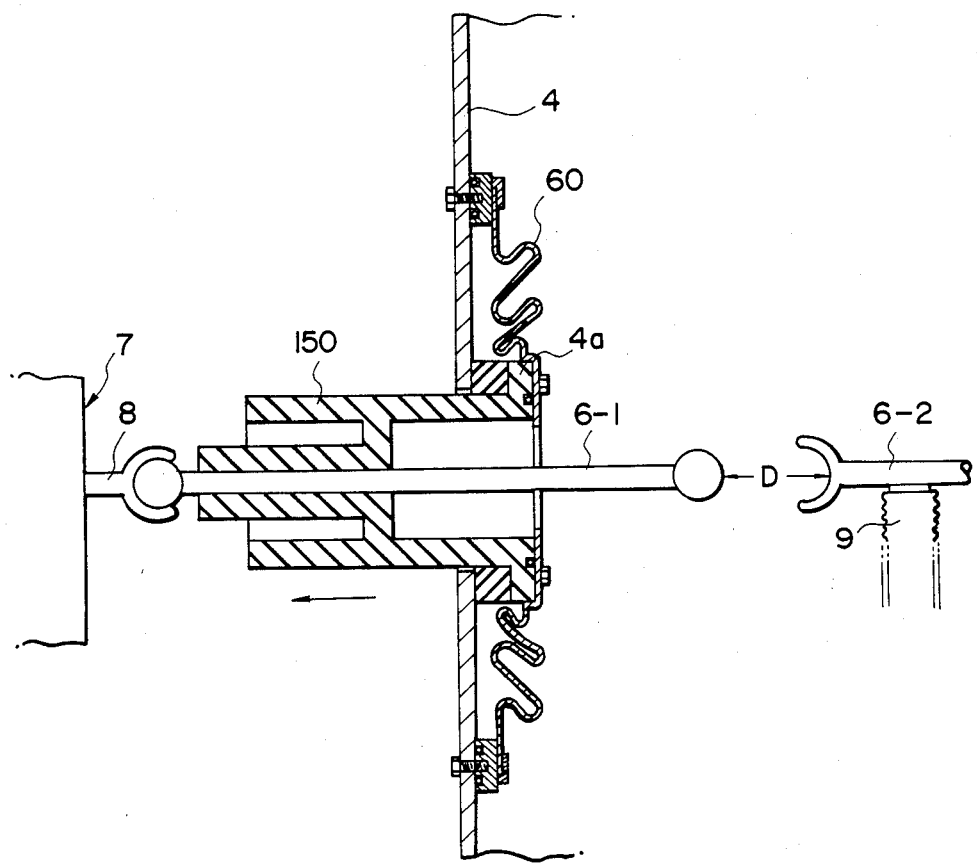

FIGS. 17A and 17B show the fourth embodiment of the cylindrical insulating bushing according to the present invention.

In FIGS. 17A and 17B, a cylindrical insulating bushing 150 is movably passed through a through hole 63 formed in the grounded metallic compartment wall 4. The bushing 150 is supported by an elastic bushing cover 60 such as a conical metalic bellows. The top portion of the bushing cover 60 is air-tightly fixed to the flange portion 153 of the bushing 150 by bolts. The bottom portion of the bushing cover 60 is air-tightly fixed to the compartment wall 4 by bolts via an annular metal mounting base 61 having O rings 62 disposed between the wall 4 and the base 61. Here, it should be noted that the through hole 41 formed in the top portion of the bushing cover 60 is smaller in diameter than the inner diameter of the bushing 150. Further, the reference numeral 64 denotes a shock absorbing stopper member made of rubber and attached to the flange portion 153 of the bushing 150.

A inner fixed conductor 6-2 is supported by a plastics or porcelain insulator 9 within the switchgear 1. An inner movable conductor 6-1 is fixed to the center of the bushing 150. Both the ends of the movable inner conductor 6-1 are so designed as to be engageable with or disengageable from the end of the inner fixed conductor 6-2 or the end of the outer movable conductor 8 as shown in FIGS. 17A and 17B. The inner movable conductor 6-1 is covered by an extension of the bushing 150 outside the switchgear 1.

In operation, when the truck-type circuit breaker 7 is moved away from the switchgear compartment 1 from the position shown in FIG. 17A, two sets of the conductors 8 and 6-1 move together with the bushings 150 and then the sets of the conductors 8 and 6-1 are disconnected from the inner fixed conductors 6-2. However, FIGS. 17A and 17B illustrate only one set of the conductors 8 and 6-1 and the inner fixed conductor 6-2. When the stopper member 64 is brought into contact with the inner surface of the wall 4, the two conductors 8 and 6-1 are disconnected from the inner fixed conductor 6-2 by a distance D as shown in FIG. 17B, in which the bushing cover 60 is fully compressed. Here, since the circuit breaker 7 is disconnected from the inner conductor 6-2 connected to a power bus or a load bus within the compartment filled with gas, it is possible to reduce the distance D as compared when the circuit breaker 7 is disconnected within air.

When the truck type circuit breaker 7 is further moved away from the switchgear compartment 1 from the position shown in FIG. 17B, the outer movable conductor 8 is disconnected from the inner movable conductor 6-1 under no-load condition within air.

When the circuit breaker 7 is moved into the compartment 1, the outer conductor 8 is first brought into contact with the inner movable conductor 6-1 and then pushes the bushing 150 inside, so that the bushing cover 60 is also pushed inside until the inner movable conductor 6-1 is engaged with the inner fixed conductor 6-2, as shown in FIG. 17A.

Here, since the annular mounting base 61 and the bushing cover 60 are both made of metal, the bushing cover 60 is grounded through the wall 4. Therefore, dielectric breakdown occurs between the bushing cover 60 and the inner movable conductor 6-1. The dimensions of the bushing 150 are of course determined so as to satisfy the conditions already explained in detail hereinabove.

In the above embodiments, the cylindrical insulating bushing is fixed to the compartment wall so as to project from the wall outside the compartment. However, it is also possible to fix the bushing so as to project from the wall inside the compartment.

As described above, in the cylindrical insulating bushing according to the present invention provided for gas insulation power equipment, since the bushing is fixed to the grounded metallic compartment wall in such a way as to project from the compartment wall toward inside or outside and since the axial length l of the inner cylindrical space of the bushing is so determined as to be $l\geq g/4$ (g: the distance between the surface of through hole and the conductor), it is possible to increase the insulation withstand voltage between the conductor passing through the bushing and the grounded metallic compartment wall without generating dielectric breakdown along the surface of the bushing.

Further, in the case where the difference in diameter between the through hole $\phi_1$ formed in the compartment wall and the inner cylindrical space $\phi_2$ of the bushing is determined to be equal to or larger than 4 mm, it is possible to further reliably prevent dielectric breakdown from being generated along the bushing surface.

Further, in the case where the conductor is disconnected within the cylindrical space of the bushing, the insertion distance B of the conductor into the inner cylindrical space of the bushing is determined to be equal to or longer than g/5 to prevent dielectric breakdown from being generated along the bushing surface.

In the cylindrical insulating bushing according to the present invention, since dielectric breakdown occurs between the grounded compartment wall and the conductor within insulation gas ambient rather than dielectric breakdown along the surface of the bushing within air ambient, it is possible to effectively reduce the size, space, weight, cost, etc. of the cylindrical insulating bushing provided for a gas insulation gas metal-clad power equipment.

What is claimed is:

1. A gas insulted metal-clad electrical power equipment, comprising:
   (a) a compartment containing an electrical power device and filled with an insulating gas;
   (b) a grounded metal wall arrangement comprising a metal plate part formed with a through hole having an electrically conductive edge surface;
   (c) a cylindrical insulating bushing having an inner cylindrical space extending on the center axis thereof and having a transverse wall blocking the inner cylindrical space, said insulating bushing having an open edge hermetically fixed to a surface of the plate part of said metal wall arrangement about the through hole so that the cylindrical space is communicated with the interior of said compartment and filled with the insulating gas, the cylindrical space being disposed coaxially with the through hole and having a diameter $\phi_2$ greater than a diameter $\phi_1$ of the through hole;

(d) an electrically conductive rod having an electrically conductive circumferential surface and passing centrally through the through hole, the cylindrical space and the transverse wall and hermetically supported by the transverse wall, said conductive rod being capable of connecting the electrical power device within said compartment to an electrical power device outside said compartment; and (e) wherein the circumferential surface of said conductive rod directly faces the edge surface of the through hole and is separated therefrom by a distance g; and (f) wherein the axial length l of the cylindrical space is equal to or longer than a quarter of the distance g.

2. The gas insulated metal-clad electrical power equipment as set forth in claim 1, wherein the metal plate part of said grounded metal wall arrangement is fixed.

3. The gas insulated metal-clad electrical power equipment as set forth in claim 1, wherein said grounded metal wall arrangement comprises a movable conical-metallic-bellows-type bushing cover which hermetically and movably supports said insulating bushing and wherein said bushing cover has a fixed end and a movable end, the fixed end being electrically and mechanically connected to the metal plate part of said ground metal wall arrangement.

4. The gas insulated metal-clad electrical power equipment as set forth in claim 1, wherein the axial length l of the inner cylindrical space is roughly equal to a diameter $\phi_1$ of the through hole.

5. The gas insulated metal-clad electrical power equipment as set forth in claim 1, wherein a diameter $\phi_2$ of the inner cylindrical space is greater by 4 mm or more than a diameter $\phi_1$ of the through hole.

6. The gas insulated metal-clad electrical power equipment as set forth in claim 2, wherein said electrically conductive rod comprises an inner fixed conductive member and inner movable conductive member electrically connectable to or disconnectable from each other at a disconnection portion therebetween disposed within the inner cylindrical space, and wherein a projection distance B of the inner fixed conductive member into the inner cylindrical space is equal to or longer than one-fifth of the distance g.

7. The gas insulated metal-clad electrical power equipment as set forth in claim 3, wherein said electrically conductive rod comprises inner fixed conductive member and inner movable conductive member electrically connectable to or disconnectable from each other at a disconnection portion therebetween disposed outside the inner cylindrical space, the inner movable conductive member comprising an inner movable conductive portion and an outer movable conductive portion, the inner movable conductive portion being first disconnected from the inner fixed conductive member together with the outer movable conductive portion within the insulating gas ambient under non-loaded condition and then the outer movable conductive portion being disconnected from the electrical power device within air ambient under non-loaded condition.

8. The gas insulated metal-clad electrical power equipment as set forth in claim 6, wherein said electrically conductive rod comprises an inner fixed conductive member and inner movable conductive member electrically connectable to or disconnectable from each other at a disconnection portion therebetween disposed within the inner cylindrical space, the inner movable conductive member comprising an inner movable conductive portion being first disconnected from the inner fixed conductive member together with the outer movable conductive portion within the insulating gas ambient under non-loaded condition and then the outer movable conductive portion being disconnected from the electrical power device within air ambient under non-loaded condition.

* * * * *